(12) United States Patent
Voss

(10) Patent No.: US 8,191,573 B2
(45) Date of Patent: Jun. 5, 2012

(54) PRESSURE REGULATING VALVE WITH A DIRECT DAMPING ACTION

(76) Inventor: Wolfgang Voss, Schwerte (DE)

( * ) Notice: Subject to any disclaimer, the term of this patent is extended or adjusted under 35 U.S.C. 154(b) by 673 days.

(21) Appl. No.: 12/226,498

(22) PCT Filed: Mar. 30, 2007

(86) PCT No.: PCT/DE2007/000581
§ 371 (c)(1),
(2), (4) Date: Oct. 20, 2008

(87) PCT Pub. No.: WO2007/121700
PCT Pub. Date: Nov. 1, 2007

(65) Prior Publication Data
US 2009/0199912 A1    Aug. 13, 2009

(30) Foreign Application Priority Data
Apr. 21, 2006  (DE) .......................... 10 2006 018 542

(51) Int. Cl.
*F16K 15/02* (2006.01)
(52) U.S. Cl. ...................... 137/538; 137/514.3; 137/508
(58) Field of Classification Search ............... 137/514.3, 137/538, 494, 377, 508; 251/50
See application file for complete search history.

(56) References Cited

U.S. PATENT DOCUMENTS

| 1,627,312 | A | * | 5/1927 | Blust .............................. 137/459 |
| 2,028,756 | A | * | 1/1936 | Crecca et al. .............. 137/512.3 |
| 2,069,022 | A | * | 1/1937 | Sisk ............................... 137/495 |
| 2,655,173 | A | * | 10/1953 | Overbeke ...................... 137/469 |
| 3,344,806 | A | | 10/1967 | Schultz |
| 4,699,171 | A | | 10/1987 | Sugden |
| 4,766,929 | A | * | 8/1988 | Yaindl ........................ 137/514.3 |
| 4,901,757 | A | * | 2/1990 | Clark, Jr. ....................... 137/496 |
| 5,201,491 | A | * | 4/1993 | Domangue ................... 251/122 |
| 2005/0173005 | A1 | * | 8/2005 | Voss .............................. 137/538 |

FOREIGN PATENT DOCUMENTS
DE    10 2004 005745    8/2005
* cited by examiner

*Primary Examiner* — Kevin Lee
*Assistant Examiner* — Macade Brown
(74) *Attorney, Agent, or Firm* — James Creighton Wray

(57) ABSTRACT

The aim of the invention is to protect hydraulic assemblies, in particular those used for hydraulic longwall working in coal mining. To achieve this, pressure regulating valves (1) are used, the damping chambers of which (20) are located, configured and connected to the inlet side (5) in such a way that a system pressure constantly prevails in said chamber (20) and only drains in a restricted manner when the pressure in the regulating valve (1) is released, thus preventing the occurrence of detrimental vibrations.

12 Claims, 2 Drawing Sheets

PRESSURE REGULATING VALVE WITH A DIRECT DAMPING ACTION

This application claims the benefit of PCT/DE2007/000581 filed Mar. 30, 2007 and German Application No. 10 2006 018 542.0 filed Apr. 21, 2006, which are hereby incorporated by reference in their entirety.

The present invention relates to a pressure regulating valve for the protection of hydraulic assemblies, in particular of hydraulic longwall working, against rock burst and other sudden overload, comprising a valve housing with a connection, the inlet side and outlet side of the valve housing being separated from one another by a closure device which is movable against the force of a valve spring and features a sealing ring, with a fixed piston and a hat-shaped valve spring plate that is movable thereon, whereby during an overload said sides are connected to one another via an inner bore in the connection and piston and via radial bores for discharging the pressure medium, a damping chamber being configured between the upper side of the piston and the lower side of the valve spring plate and connected to the inlet side via the inner bore.

A pressure regulating valve of this type is apparent from DE 10 2004 005 745 A1. Pressure regulating valves of this type are especially used in subsurface coal mining for protecting longwall cavities, but also for preserving the shield framework used in the gallery against rock bursts and other sudden overload situations. These pressure regulating valves are designed and configured such that a valve piston, which is movable along a bore, is pressed against the spring plate (DE 199 46 848 A1) during a corresponding overload, moving the spring plate against the force of the valve spring with a correspondingly high overload and overruns a sealing ring until the radial bores configured in it create a connection between the blind hole in the valve piston and the outlet bores. The pressure medium may then rapidly flow off so that the corresponding hydraulic assembly is discharged and the pressure regulating valve closes again. Since with these simpler pressure regulating valves vibrations cannot always be avoided in the system due to upstream devices, in accordance with DE 10 2004 005 745 A1, a fixed piston, i.e. a piston coupled to the connection, is provided, on which the actual valve spring plate is arranged in a movable manner, overrunning and/or releasing the radial bores configured in the piston such that the pressure medium may then flow out through outlet bores configured on the bottom of the valve housing. A long throttle bore is configured in the piston, and directly exposes and/or connects the damping chamber configured between the piston and the valve spring plate to the system pressure. This means that when there is an overload, the pressure medium acted on by the system pressure not only provides that the spring plate is lifted and the radial bores exposed, but also that the damping chamber is simultaneously filled via the throttle bore, so that the retraction of the spring plate during discharge is only possible in a restricted manner, i.e. by simultaneously pressing out the pressure medium from the damping chamber via the throttle bore. In this way the vibrations in the system are impeded. But it has been found that a reaction, especially during faster vibrations, is practically impossible due to the special configuration of the throttle bore, in particular its length. In addition, the discharge of the pressure medium through the outlet bores configured on the bottom and/or through the connecting washer of the valve housing is unsatisfactory. Hence, the pressure regulating valves configured in this way do not meet all safety requirements and do not always produce the desired direct damping.

It is therefore the object of the present invention to prevent as completely as possible detrimental vibrations from the opening or closing of pressure regulating valves used in subsurface mining and similar industrial areas.

This object is attained according to the invention in that the damping chamber is connected to the inlet side via an inner three-step bore, only the uppermost partial bore being configured as a throttle bore, while the partial bore serving as a large-volume discharge bore extends marginally over the radial bores, and the central partial bore to the throttle bore has a reduced diameter relative to the discharge bore, and a significantly larger diameter relative to the throttle bore.

First of all, a pressure regulating valve configured this way ensures that the pressure medium entering the pressure regulating valve at high pressure when the pressure regulating valve is activated may safely flow out via the large-volume discharge bore and radial bores in order to achieve an early as possible relief of the downstream hydraulic assembly. At the same time, however, the damping area has the necessary amount of pressure medium available because the central partial bore leading in that direction has an accordingly augmented volume and/or an enlarged diameter. The actual throttle bore itself forms only the uppermost partial area of the entire inner bore, so that although there is always system pressure in the damping chamber, but due to the shortness of the throttle bore, a fast reaction to vibrations is possible. Thus, vibrations that arise are immediately and completely prevented, so that the actual pressure regulating valve remains unaffected. Since in most cases the vibrations are produced by up-stream hydraulic assemblies, they are in fact transferred to the pressure regulating valve itself, but rendered "harmless" in it. As already mentioned, however, the amount of pressure medium that is required for the relief can rapidly flow out, first reaching, as will be explained below, the interior of the valve housing, in order to be subsequently discharged via the shortest and fastest path.

According to an advantageous embodiment of the invention, it is provided that the central partial bore at the upper border of the radial bores is configured with a funnel-shaped lug connecting to the outflow bore. By means of this embodiment, the central partial bore important for the transfer of the system pressure to the damping chamber is always supplied with sufficient pressure medium, which may then flow into the damping chamber via the partial bore and the short throttle bore. Potentially detrimental turbulence is also avoided in this area.

The detrimental vibrations of the valve, or rather in the valve, are prevented according to the invention in that the throttle bore features an at least considerably reduced length, preferably ⅙ of the length of the central partial bore, and an accordingly reduced diameter, in order to prevent the vibrations of the valve and/or valve spring plate. This means that on the one hand, enough pressure medium under high pressure will enter the damping chamber in a short time, and on the other hand, a corresponding amount will also flow out again via the throttle bore when the valve is closed, but accordingly throttled, so that the desired damping takes place rapidly and safely for the necessary time. Thus the vibrations may be systematically and safely prevented.

Fast and safe dispersion of the pressure medium flowing over the inner bore and radial bores is achieved in that the connection is coupled to the valve housing via a connecting washer and that the spring adjustment screw is fitted with a through hole acting as an outlet bore for the dispersing pressure medium. Hence in contrast to the prior art, the pressure medium is guided simply into the valve housing, so that first of all there is a pressure release in this area, without the risk of high-pressure pressure medium getting into the longwall. The pressure medium, already somewhat depressurized in the valve housing, in fact is discharged to the atmosphere after flowing through the entire valve housing via the through hole in the spring adjustment screw. In this way, a fast and even discharge is ensured.

In order to prevent dirt from entering the valve housing via the through hole, it is provided that the through hole in the spring adjustment screw is covered by a protective cap attached to the upper border of the valve housing. The pressure medium, which has already been depressurized at this point, may thus largely flow off evenly from the valve housing, namely below the protective cap, which at the same time can fully function as an through hole cover.

As a result of the through hole provided in the spring adjustment screw, the actual spring adjustment screw cannot be used for guiding the valve spring. Rather, according to the invention, it is provided that the spring adjustment screw has a spring bore receiving and guiding the valve spring, which merges into the reduced through hole. Accordingly, it is at the same time possible for the pressure medium to flow through the spring, but also past it into the through hole. The upper part of the valve spring is thus guided safely, being additionally guided at the lower part by the accordingly bulging spring plate.

Placement of the hat-shaped valve spring plate on the fixed piston is facilitated during assembly in that the valve spring plate features a chamfered section on the inner surface of its flat part. Thus, a sort of guide is provided when the valve spring plate is mounted on the fixed piston.

For better assembly and simpler production, the invention likewise provides that the piston has a relief at the transition to the connection. This simultaneously ensures that the hat-shaped spring valve plate may be adequately pressed into the rest position by the valve spring and held in that position. The base of the flat part thus tightly abuts the surface of the connection, and an effective seal of the radial bores in the fixed piston is ensured. This is particularly the case when the relief is configured to reach the lower border of the radial bores, in order to achieve a secure seat of the hat-shaped valve spring plate.

In order to facilitate assembly, it is provided that the connection as well as the connecting washer and/or the valve housing have corresponding holding lugs and retaining collars. In this way, it is possible to slide the connecting washer as well as the connection into the valve housing from above, and accordingly fix them in the housing by means of the valve spring plate and the actual valve spring without the need for bolting, pinning, or similar procedures.

Assured lifting of the valve spring plate and thus the necessary lifting effect is ensured if the upper part of the connection is configured to be slightly protruding over the upper part of the connecting washer in the direction of the base of the flat part of the valve spring plate. The bottom, or rather the base of the flat part, then only abuts on the connection and/or upper side of the connection and secure lifting of the valve and elevation of the valve spring plate without the risk of a spring plate adhesion is possible when the valve is activated.

The invention is especially characterized by the fact that a pressure regulating valve has especially been created for use in hydraulic longwall working in coal mining, which reacts quickly and safely during a sudden overload and also during vibrations, mostly caused by other hydraulic assemblies, and rapidly reduces and/or renders the vibrations entirely harmless, so that they have no detrimental effect on the interior of the pressure regulating valve. The relatively short throttle bore at the upper part of the fixed piston, and thus at the upper end of the inner bore ensures that the pressure medium adequately and rapidly passes through the throttle bore into the damping chamber, but ensuring an even retraction of the valve spring plate on the fixed piston when the valve is again closed and/or during vibrations, so that said vibrations are not noticeably detrimental. The relatively short throttle makes a rapid reaction to the occurring vibrations possible. Thus the valve immediately reacts and can fulfill its function, allowing the pressure medium released via the inner bores and radial bores to be safely discharged through the valve housing and then proceed to the atmosphere via the through hole in the spring adjustment screw.

Further details and advantages of the subject matter of the present invention will be apparent from the following description of the corresponding drawing, which illustrates a preferred exemplary embodiment including the necessary details and individual parts. In the drawing:

DETAILED DESCRIPTION OF THE PREFERRED EMBODIMENTS

Figure 1:
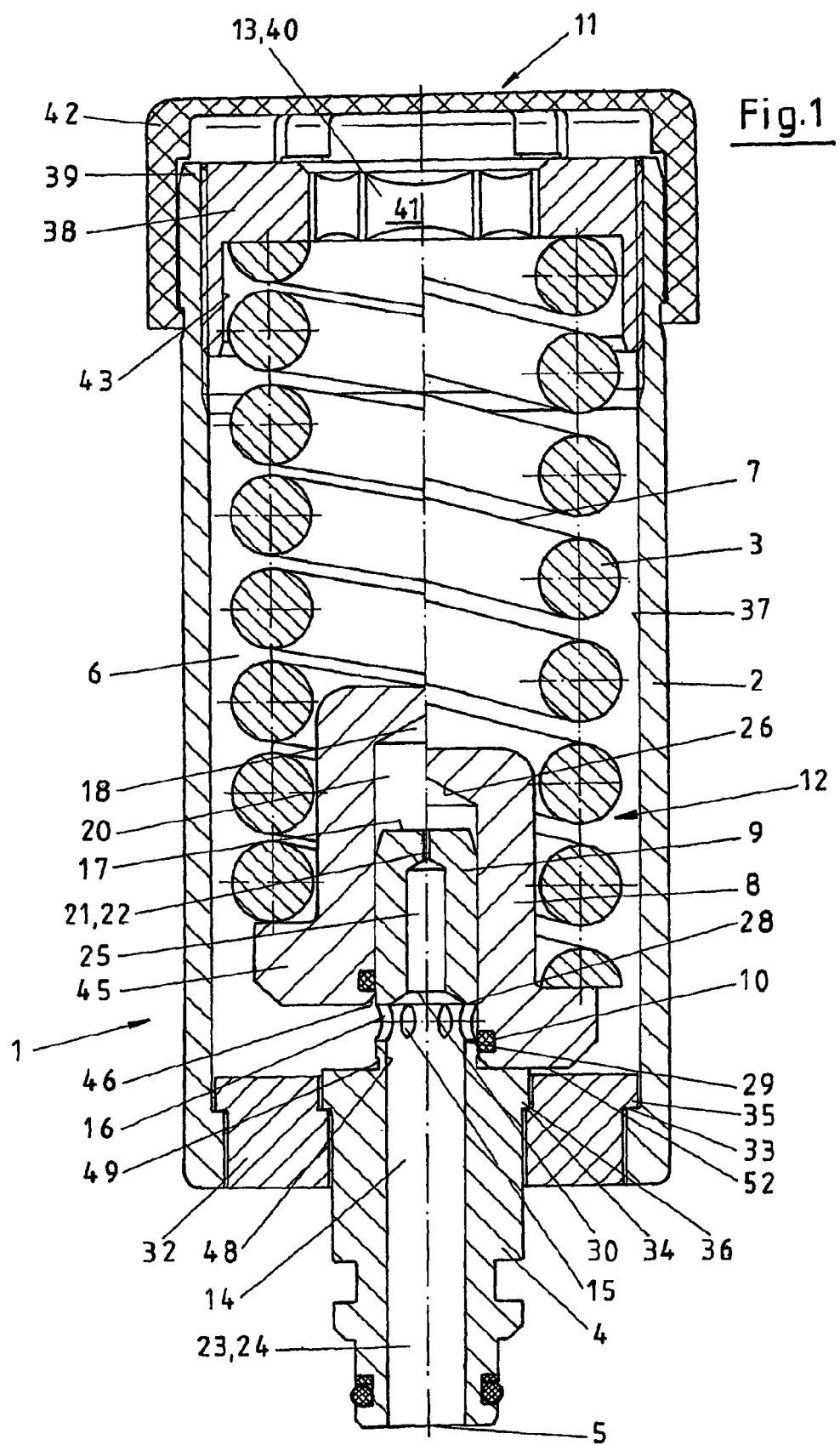
FIG. 1 shows a cross-section of a pressure regulating valve in the rest position (right side) and in the active position (left side) and FIG. 2 shows an enlarged reproduction of the connection with the piston.

FIG. 1 shows a cross-section of the pressure regulating valve 1, where it becomes apparent that a valve spring 3 is arranged in the valve housing 2 such that it holds the valve spring plate 8, configured in a hat shape, on the piston 9, which is part of the connection 4 is firmly secured to the connection 4. The connection 4 forms the inlet side 5 of the pressure regulating valve 1, which is connected to a hydraulic assembly that is not shown. During an overload, the pressure medium is pressed upward from the inlet side 5 through the inner bore 14 up to the radial bores 15, 16, said pressure medium at the same time connecting the damping chamber 20 to the system pressure and/or filling said pressure chamber 20 through the inner bore 14. As soon as the valve spring plate 8 is raised against the pressure of the valve spring 3 to the extent that the radial bores 15, 16 are free, the hydraulic fluid and/or pressure medium sprays into the interior of the valve housing 6 and is guided through it and through the interior of the valve spring 7 in the direction of the outlet side 11 and thus in the direction of the spring adjustment screw 38 and discharged into the atmosphere via the outlet 13 and or outlet 40. This outlet 40 and/or through hole 41 is covered by a protective cap 42, so that dirt is prevented from entering the interior of the valve housing 6.

Leakage of the pressure regulating valve 1 is prevented in that the inner bore 14 is sealed against the radial bores 15, 16 via a sealing ring 10, so that the pressure medium may flow out via the radial bore 15, 16 only when the hat-shaped valve spring plate 8 is raised high enough against the force of the valve spring 3.

The damping chamber 20 addressed above is configured between the upper side 17 of the piston 9 and the lower side 18 of the valve spring plate 8, namely at the upper hat-shaped part of the valve spring plate 8. This damping chamber 20 is connected to the uppermost partial bore 21 in the form of a throttle bore 22 to the central partial bore 25 and then again to the partial bore 23, acting as an outflow bore 24, so that the system pressure is connected to the damping chamber 20 via this three-step inner bore 14. Thus the damping chamber 20 is always under the system pressure. This assures the corresponding damping automatically even when the valve is activated and the valve spring 3 is again retracted. The upper part of the damping chamber 20 is labeled 26, but this tapering chamber attachment 26 may also be dispensed with if necessary. This is a production measure.

Figure 2:
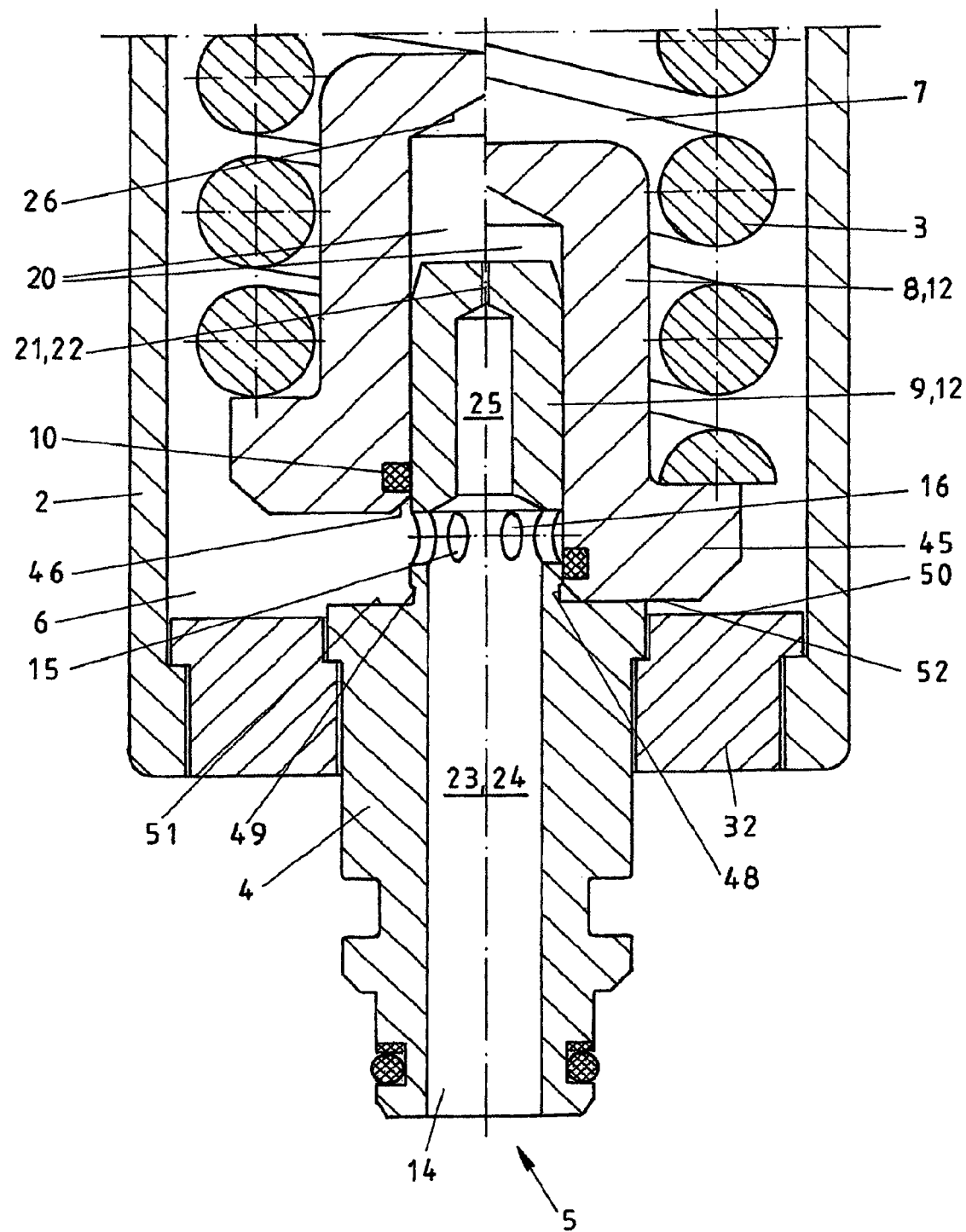

The pressure medium entering the inner bore 14 and/or partial bore 23 is guided into the interior of the valve housing 6 via the radial bores 15, 16 when the pressure regulating valve is open. In order to ensure that the pressure medium is also present in the central partial bore 25, and therefore in the throttle bore 22, a funnel-shaped attachment 30 is formed in the area of the upper border 28 of the radial bores 15, 16 with which the actual central partial bore 25 then merges. In FIG. 1 and FIG. 2 it is further apparent that the sealing ring 10 is arranged and attached such that the lower border 29 of the radial bores 15, 16 are also covered in the closed state of the pressure regulating valve 1. The pressure medium then cannot flow past the sealing ring 10 in this state, but at the most through the groove between the piston 9 and the hat-shaped valve spring plate 8, whereby these small amounts of pressure medium are then guided into the area of the damping chamber 20.

During assembly of a pressure regulating valve 1 of this type, the connecting washer 32 and the connection 4 are pushed into the empty valve housing 2 from above. They are connected to one another and to the inner wall 37 of the valve housing 2 via the holding lugs 33, 34 and/or retaining collars 35, 36 and connected and/or nested in one another such that they are finally secured after placement of the hat-shaped valve spring plate 8, fitting of the valve spring 3, and tensioning of the valve spring 3 by means of the spring adjustment screw 38. In particular in FIG. 2, it is apparent that the upper side 51 of the connection 4 slightly protrudes over the upper side 50 of the connecting washer 32, so that the base 52 of the flat part 45 only abuts on the upper side 51, which is illustrated very well in FIG. 2.

A protective cap 42 is provided at the upper border 39 of the valve housing 2, and indeed is arranged and configured such that the pressure medium may flow past this protective cap 42 after leaving the through hole 41 without the risk of dirt particles entering the interior of the valve housing 6 by that route. The spring adjustment screw 38 features the already mentioned through hole 41, so that the pressure medium may reach the atmosphere past the protective cap 42 via that outlet. The spring adjustment screw 38 itself is configured such that a spring bore 43 is present at the lower side, and is used for guiding the valve spring 3.

On the inner surface of the hat-shaped valve spring plate 8, a chamfered section 46 is provided, which facilitates placement the valve spring plate 8 on the piston 9. This is likewise promoted by the fact that the piston 9 likewise features a chamfer at its free end, which promotes this placement.

An exact seat of the hat-shaped valve spring plate 8 on the piston 9, according to FIG. 1 and FIG. 2 is promoted by the fact that a relief 49 is provided at the transition 48 from the piston 9 to the connection 4, which may especially be discerned from FIG. 2.

During an overload, the pressure on the valve spring plate 8 increases as pressure medium reaches the damping chamber 20 via the three-step inner bore 14. The valve spring plate 8 is lifted against the pressure of the valve spring 3 in the direction of the spring adjustment screw 38, so that it assumes the position shown on the left side of FIG. 1, in which the radial bores 15, 16 are now free. Thus, it is possible for the pressure medium to flow out into the interior of the valve housing 6 via the partial bore 23 and radial bores 15, 16 and from there out of the pressure regulating valve 1, doing so via the outlet 40 and/or through hole 41. The damping chamber 20 is still connected to the system pressure, i.e. the incoming pressurized fluid, and accordingly also filled with pressure medium. If there is now pressure release because enough pressure medium has dispersed, or a vibration has arisen, provoked by a third hydraulic assembly, the valve spring 3 will attempt to push the valve spring plate 8 back to the initial position, as illustrated on the right side of FIGS. 1 and 2. Since the damping chamber 20 is filled, this is not easily possible, but rather only by displacement of the pressure medium in the damping chamber 20. Direct discharge is not possible in this case because the upper end, i.e. the uppermost partial bore is configured as a throttle bore and acts as a throttle bore 22. This means that the pressurized medium in the damping chamber 20 can only flow off slowly and within limits, so that the valve spring plate 8 accordingly also only sinks slowly, and is can release the valve spring 30 gradually and evenly. Consequently the valve spring plate and/or valve spring 3 cannot vibrate. This applies to the entire distribution path of the pressure medium, which has to be discharged from the damping chamber 20 via the throttle bore 22 in order to permit the return of the valve spring plate 8 to the position shown on the right side of FIGS. 1 and 2.

All mentioned features, including those solely disclosed in the drawings, are considered to be essential to the invention both alone and in combination.

The invention claimed is:

1. A pressure regulating valve for the protection of hydraulic assemblies of hydraulic longwall working, against rock burst and other sudden overload, comprising a valve housing (2) with a connection (4), an inlet side (5) and an outlet side (11) of the valve housing (2) being separated from one another by a closure device (12) which is movable against force of a valve spring (3) and features a sealing ring (10), with a fixed piston (9) and a hat-shaped valve spring plate (8) that is movable thereon, whereby during an overload said inlet and outlet sides are connected to one another via a three-step inner bore (14) in the connection (4) and the piston (9) and via radial bores (15, 16) for discharging a pressure medium, a damping chamber (20) being configured between an upper side (17) of the piston (9) and a lower side (18) of the valve spring plate (8) and connected to the inlet side (5) via the inner bore (14), wherein the damping chamber (20) is connected to the inlet side (5) via the three-step inner bore (14), an uppermost partial bore (21) being configured as a throttle bore (22), while a partial bore (23) serving as a large-volume discharge bore (24) extends partially over the radial bores (15, 16), and a central partial bore (25) has a reduced diameter relative to the discharge bore (24), and the central partial bore has a significantly larger diameter relative to the throttle bore (22).

2. The pressure regulating valve according to claim 1, wherein above the radial bores (15, 16), the central partial bore (25) is configured with a funnel-shaped connection (30) connecting the central partial bore 25 to the outlet bore (24).

3. A pressure regulating valve according to claim 1, wherein the throttle bore (22) features a length which prevents or reduces vibrations of the valve (1) and the valve spring plate (8).

4. A pressure regulating valve according to claim 1, wherein the connection (4) is coupled to the valve housing (2) via a connecting washer (32) and a spring adjustment screw (38) is provided with a through hole (41) acting as an outlet bore (13, 40) for discharging the pressure medium.

5. A pressure regulating valve according to claim 4, wherein the through hole (41) in the spring adjustment screw

(38) is covered by a protective cap (42) attached to an upper portion (39) of the valve housing (2).

6. A pressure regulating valve according to claim 4, wherein the spring adjustment screw (38) features a spring bore (43) receiving and guiding the valve spring (3), and wherein the spring bore (43) merges into the reduced through hole (41).

7. A pressure regulating valve according to claim 1, wherein the valve spring plate (8) has a chamfered section (46) on an inner surface of a flat part (5) of the valve spring plate (8).

8. A pressure regulating valve according to claim 1, wherein the piston (9) has a relief (49) at a transition (48) to the connection (4).

9. A pressure regulating valve according to claim 8, wherein the relief (49) is configured to reach lower portions (29) of the radial bores (15, 16).

10. A pressure regulating valve according to claim 4, wherein the connection (4), the connecting washer (32) and the valve housing (2) have corresponding holding lugs (33, 34) and retaining collars (35, 36).

11. A pressure regulating valve according to claim 4, wherein an upper side (51) of the connection (4) is configured to partially protrude over an upper side (50) of the connecting washer (32) in the direction of a base (52) of the flat part (45) of the valve spring plate (8).

12. A pressure regulating valve according to claim 1, wherein the length of the throttle bore (22) is ⅙ of a length of the central partial bore (25).

* * * * *